United States Patent
Yahata et al.

(10) Patent No.: US 6,480,483 B2
(45) Date of Patent: *Nov. 12, 2002

(54) FRAME SYNCHRONIZATION SYSTEM BETWEEN BASE STATIONS OF MOBILE RADIO COMMUNICATION SYSTEM AND BASE STATION DEVICE EMPLOYING THIS SYSTEM

(75) Inventors: Haruki Yahata, Fujisawa (JP); Katsuhiko Mishima, Yokohama (JP); Satoru Tsujimura, Hino (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,716

(22) PCT Filed: Dec. 26, 1997

(86) PCT No.: PCT/JP97/04908

§ 371 (c)(1),
(2), (4) Date: Aug. 24, 1998

(87) PCT Pub. No.: WO98/31111

PCT Pub. Date: Jul. 16, 1998

(65) Prior Publication Data

US 2002/0012362 A1 Jan. 31, 2002

(30) Foreign Application Priority Data

Dec. 26, 1996 (JP) .............................................. 8-348964

(51) Int. Cl.$^7$ .................................................. H04J 3/06

(52) U.S. Cl. .................... 370/350; 370/310; 370/324; 370/328; 370/498; 370/503; 370/507; 375/356

(58) Field of Search .................................. 370/324, 503, 370/504, 505, 509, 510, 512, 520, 331, 337, 350, 310, 328, 498, 507; 375/354, 355, 356, 357, 362, 365, 366; 455/422, 507, 524, 525

(56) References Cited

U.S. PATENT DOCUMENTS 4,665,404 A * 5/1987 Christy et al. .............. 342/463

(List continued on next page.)

FOREIGN PATENT DOCUMENTS

| EP | 0 578 506 A2 | 1/1994 |
| JP | 08 205233 | 8/1996 |
| JP | 8-289359 | 11/1996 |
| WO | WO 94/28643 | 12/1994 |

OTHER PUBLICATIONS

Search Report.
H. Kazama et al., "Semi–Autonomous Synchronization among Base Stations for TDMA–TDD Communication Systems", IEICE Trans. Commun. vol. E77–B, No. 7, pp. 862–867, 1994.

(List continued on next page.)

Primary Examiner—Hassan Kizou
Assistant Examiner—Joe Logsdon
(74) Attorney, Agent, or Firm—Banner & Witcoff, Ltd.

(57) ABSTRACT

The disclosure concerns an inter-base station frame synchronization system for use in a mobile communication system having at least one master base station and a plurality of slave base stations. The master base station is arranged to transmit a control channel signal to the slave base stations located around the master base station in synchronization with a reference frame timing. The slave base stations set a control channel signal observation period. The slave base stations are arranged to generate frame timing based on timings of a received control channel signal from the master base station or other slave base stations when the received control channel signal is received during the control channel signal observation period.

12 Claims, 9 Drawing Sheets

U.S. PATENT DOCUMENTS

| | | | | |
|---|---|---|---|---|
| 5,363,375 | A | * 11/1994 | Chuang et al. | 370/95.3 |
| 5,363,376 | A | * 11/1994 | Chuang et al. | 370/95.3 |
| 5,448,570 | A | 9/1995 | Toda et al. | |
| 5,537,685 | A | * 7/1996 | Matsuno | 455/51.1 |
| 5,613,211 | A | * 3/1997 | Matsuno | 455/51.1 |
| 5,666,366 | A | * 9/1997 | Malek et al. | 370/505 |
| 5,862,142 | A | * 1/1999 | Takiyasu et al. | 370/480 |
| 5,978,369 | A | * 11/1999 | Silvestre et al. | 370/350 |
| 6,016,331 | A | * 1/2000 | Archambaud et al. | 375/371 |
| 6,112,100 | A | * 8/2000 | Ossoinig et al. | 455/502 |
| 6,198,784 | B1 | * 3/2001 | Archambaud et al. | 375/371 |
| 6,304,560 | B1 | * 10/2001 | Archambaud et al. | 370/324 |
| 6,308,078 | B1 | * 10/2001 | Van De Water | 455/503 |

OTHER PUBLICATIONS

Akaiwa et al., "Autonomous Decentralized Inter–Base Station Synchronization for TDMA Microcelluar Systems", IEEE, pp. 257–262, 1991.

J. Chuang, Autonomous Time Synchronization Among Radio Ports in Wireless Personal Communications, IEEE Transactions on Vehicular Technology, vol. 43, No. 1, 1994.

* cited by examiner

FRAME SYNCHRONIZATION SYSTEM BETWEEN BASE STATIONS OF MOBILE RADIO COMMUNICATION SYSTEM AND BASE STATION DEVICE EMPLOYING THIS SYSTEM

TECHNICAL FIELD

The present invention relates to a mobile communication system for performing wireless communication by connecting a base station and a mobile station to each other using a TDD (Time Division Duplex) system such as a digital personal handyphone system and a simplified type personal handyphone system. More particularly, the present invention relates to a system for effectively utilizing wireless frequency by improving an inter-base-station frame synchronous system.

BACKGROUND ART

Recently, a simplified type personal handyphone system (hereinafter, briefly called a PHS) using a micro cell has been developed as one type of digital mobile communication systems. This simplified type personal handyphone system will be practically used in the near future.

FIG. 1 is a view showing the basic construction of a conventional PHS. Plural PHS base stations CS1 to CSm are dispersively arranged in a service area. Wireless zones Z1 to Zm called cells each having a radius from 100 to 500 meters are formed by these PHS base stations CS1 to CSm. Each of the PHS base stations CS1 to CSm is connected to an integrated service digital network (hereinafter, briefly called an ISDN) INW having a PHS connecting device PM.

Each of mobile stations PS1 to PSn is selectively connected to each of the PHS base stations CS1 to CSm through a wireless channel within the wireless zones Z1 to Zm formed by the above PHS base stations CS1 to CSm. Each of the mobile stations PS1 to PSn is connected to each of wire telephones TEL1 to TELk through the above ISDN or this ISDN and a subscription phone network SNW from these PHS base stations CS1 to CSm. Direct communication can be also performed between the mobile stations PS1 to PS2 by performing connecting control in the PHS base stations CS1.

The PHS has a control center CC having a database, a customer information management database, etc. Information relative to the above mobile stations PS1 to PSn and the PHS base stations CS1 to CSm are collected into this control center CC through the ISDN and a packet network PNW. Service management and control such as authentication, accounting, network management, etc. are performed on the basis of this information.

The PHS adopts a time division multiple access (TDMA) system as an access system between the PHS base stations CS1 to CSm and the mobile stations PS1 to PSn. Further, the PHS adopts a time division bidirectional multiplex (TDD: Time Division Duplex) system as a transmission system.

For example, as shown in FIG. 2, a frame of the TDMA-TDD system is constructed by a forward link and a reverse link. In the forward link, four transmitting slots T1 to T4 are time-divided and multiplexed. In the reverse link, four receiving slots R1 to R4 are time-divided and multiplexed. One frame length is set to 5 ms and a transmission speed in transmission and reception is set to 384 kbps. One slot length is set to about 625 $\mu$sec and a transmission speed of information per one slot is set to 32 kbps except for an error correction code, etc.

In calling-out of each of the mobile stations PS1 to PSn, each of the PHS base stations CS1 to CSm transmits timing information of the above TDMA-TDD frame to each of the mobile stations existing within the wireless zones Z1 to Zm of the PHS base stations CS1 to CSm, and synchronizes transmission/reception timing of each of the mobile stations with transmission/reception timing of its own station. In this state, an idle slot within the frame and an idle wireless frequency are allocated to each of the mobile stations as a channel for communication. Thereafter, wireless communication is performed between each PHS base station and each mobile station by using this channel for communication. Accordingly, with respect to each of the PHS base stations CS1 to CSm, the wireless communication can be performed such that the plural mobile stations located within the wireless zones Z1 to Zm of the PHS base stations CS1 to CSm are operated in synchronization with each other and do not come into collision with each other.

However, in the PHS, each of the PHS base stations CS1 to CSm generally generates the TDMA frame independently and performs the communication. Accordingly, no synchronization of the TDMA frame is performed between the PHS base stations CS1 to CSm. Therefore, there is a case in which an interference is caused between the plural base stations of which the wireless zones are adjacent to each other. For example, a transmitting signal of the transmitting slot T1 of an adjacent base station CSa is received in the receiving slot R4 of a base station CSb between the base stations CSa and CSb performing communication in timing shown in FIG. 3. Therefore, an interference is caused in the slot R4 of the base station CSb. To avoid this interference, another slot must be used instead of the slot causing the interference, or a wireless frequency used in the slot causing the above interference must be changed to another frequency.

However, the number of slots of one frame is set to only four in each of transmission and reception. Therefore, interference cannot be avoided by changing the above slots in many cases so that the frequency change must be used. Namely, since no frames are synchronized with each other between the PHS base stations, the channels for communication which were originally usable, become unusable. As a result, utilization efficiency of the communication channel is reduced. This reduction is not very preferable since this reduction causes an increase in lost-call rate when the number of subscribers is increased.

Therefore, there are conventionally several proposals for synchronizing frames with each other between the PHS base stations. Frame synchronous systems provided by these proposals are first classified into a fixed connecting system and an autonomous connecting system in view of synchronous connection.

(A) Fixed Connecting System

This system is a system for predetermining from which base station a certain base station obtains a timing signal for synchronization. Since a position of each base station is known, a propagation delay time between the base stations can be approximately calculated so that the delay time can be simply corrected. However, different data must be inputted and set to each base station. Further, when a new base station is arranged and an arranging position of the base station is changed, a drawback exists in that it is necessary to re-input and reset data for every change.

(B) Autonomous Connecting System

This system is a system for selecting a base station obtaining a timing signal for synchronization on the basis of a certain constant rule. For example, four base stations are selected in the order of larger receiving levels and its average timing is selected. In this system, it is not necessary to input different data for every base station and it is possible to easily cope with situations in which a new base station is arranged and its arranging position is changed. However, it is necessary to repeatedly make calculations for determining timing until the synchronization of an entire system is converged. Further, it is difficult to correctly know a delay time.

Next, the frame synchronous systems are divided into a mutual synchronous system and a master-slave synchronous or master-slave and mutual hybrid synchronous system in view of a synchronous hierarchy.

(1) Mutual Synchronous System

This system is a system for determining frame timing of its own station based on a receiving signal from a mutually adjacent station without arranging a master station as a synchronous source. In this system, problems exist in that it takes much time to converge synchronization since the base stations are mutually influenced, and a converging state is influenced by a delay time.

(2) Master-slave Synchronous or Master-slave and Mutual Hybrid Synchronous System This system is a system in which a master station as a synchronous source is arranged and all other base stations (slave stations) are operated in synchronization with the master station. Perfect master-slave synchronization is set if all the base stations are operated by a synchronous hierarchy in synchronization with each other based on the timing of an upper hierarchy base station. Further, hybrid synchronization is set if all the base stations are operated in synchronization with stations of the upper hierarchy and/or the same order hierarchy. For example, the master station has a time measuring system using a satellite position measuring system (GPS) and determines a frame delimiter with a time signal obtained by this time measuring system as a trigger signal. In this system, synchronization is stable, but it is necessary to take measures, etc. for a case in which the master station is broken.

Specific examples of synchronous systems by combining the above two classified systems are proposed in papers. Brief explanations and problems of these different synchronous systems will next be described.

(a) Autonomous Connecting Mutual Synchronous System

In this system, burst signals transmitted from each of plural surrounding base stations are received and a weighted average value of the rising timing of a frame/slot is calculated on the basis of a receiving electric field intensity of this burst signal. Timing of the transmitted burst signal of its own station is determined on the basis of this calculated value and is transmitted. Each of the surrounding base stations also receives plural burst signals and similarly calculates a weighted average value with the receiving electric field intensity, and determines timing of the transmitted burst signal of its own station from this calculated weighted average value. The above process is repeated until an error in transmission timing of its own station converges within a certain constant range in each base station.

This system is described in detail in "Y. Akaiwa et al: "Autonomous Decentralized Inter-base-station for TDMA Microcellular Systems" Proceeding IEEE VTC+ 91, PP. 257–262, May 1991".

In this system, each base station is autonomously operated so that merits exist in that no control using a control center is required, etc. However, this system has the following various kinds of problems. (1) A dedicated receiver for monitoring the plurality of surrounding base stations at any time is required so that the base stations are large-sized and cost thereof is increased. (2) Time required in which the error is converged in frame timing between the base stations to a constant value is increased as the number of base stations is increased. (3) There is a difficult problem with respect to stability until frame timings of all the base stations are converged by a repeating operation of the above process. (4) Since a correcting amount for correcting dispersion of the propagation delay time caused by the difference in distance between the base stations is a constant value, no frame timing precision can be secured after the convergence.

(b) Fixed Connecting Mutual Synchronous System

This system is a system proposed such that defects of the above autonomous connecting mutual synchronous system are compensated. This system is basically the same system as this autonomous connecting mutual synchronous system. However, in this system, each base station does not monitor all transmitting burst signals of other base stations around its own station, but monitors only plural base stations determined in advance and performs synchronization. Therefore, place coordinates of the base stations as monitored objects around its own station and place coordinates of its own station are inputted to each base station in advance. Each base station checks an ID number of the base station included in a received burst signal, calculates the distance between both the base stations from the place coordinates of its base station and the place coordinates of its own base station, and determines transmitting frame timing of its own station by correcting the propagation delay time on the basis of this calculated distance value.

This system is described in detail in "H. Kazama et al: "Semi-Autonomous Synchronization among Base station for TDMA-TDD Communication systems", IEICE Trans. Commun., Vol. E77-B, pp. 862–867, July, 1994".

In this system, correcting precision of the propagation delay time is improved so that merits exist in that frame timing is extremely accurate after convergence. However, this system has the following various kinds of problems. Namely, (1) a dedicated receiver for monitoring a partner base station at any time is required so that the cost of a product is increased. (2) There is a difficult problem with respect to converging stability since a connection path will be missing when this synchronous system is disturbed as in regional power supply interruption, etc. (3) It is necessary to provide a large amount of individual information such as the correct place coordinates of surrounding base stations, etc. to each base station in advance so that it is troublesome to manage this information.

(c) Autonomous Connecting Master-slave Synchronous System

In this system, a master base station as a source in synchronous setting and slave base stations for receiving a transmitting burst signal of this master base station and performing synchronization based on this burst signal are determined in advance. Further, slave base station groups are hierarchically formed. At the beginning of synchronization, the master station is set to an uppermost hierarchy order and the slave stations are set to lowermost hierarchy order. Each base station is set to be operated in synchronization with signals of upper stations higher than its own station among receiving signals. The systematic synchronization is autonomously advanced by reducing the hierarchy of its own station from its upper station by one stage and resetting this hierarchy. For example, the master base station as an uppermost station determines frame timing on the basis of high precision time information from a GPS.

This system is described in detail in "J. Chang: "Autonomous Time Synchronization Among Radio Ports in Wireless Personal Communications", IEEE Trans. VT, Vol. 43, No. 1, pp. 27–32, Feburary 1994".

In this system, it is not necessary to perform mutual synchronization so that merits exist in that a synchronous converging time is shortened, etc. from (a) and (b). However, this system has the following various kinds of problems. Namely, (1) a dedicated receiver for monitoring surrounding base stations at any time is required and the hierarchy of its own station must be transmitted together with a synchronous signal at any time so that a product is large-sized and cost thereof is increased. (2) Measures for coping with problems in practical use (for example, a method for coping with a case in which no master base station can transmit a signal by an unexpected accident, etc.) are not clear. (3) When the number of hierarchies is increased, there is a limit in hierarchy since errors in propagating delay time increase with each other in accordance with the distance between the base stations. (4) Since repeat calculation must be carried out, synchronous convergence time is relatively longer.

The autonomous connecting master-slave synchronous system among the above inter-base-station frame synchronous systems is most preferable since stable synchronization can be expected and is not influenced by arranging a new base station and discontinuing a base station. However, in this autonomous connecting master-slave synchronous system, it is necessary to carry out operations of controlling and transmitting the synchronous hierarchy until convergence so that the construction of the base station becomes complicated.

The inventors in this application proposed an inter-base-station frame synchronous system capable of solving these disadvantages in Jpn. Pat. Appln. KOKAI Publication No. 8-289359.

However, in techniques of this Jpn. Pat. Appln. KOKAI Publication No. 8-289359, each base station generates frame timing of its own station in an arbitrary frame synchronous control period among plural frame synchronous control periods set in time division. Therefore, when frame timing on an upper base station is completely generated, no generation processing of the frame timing can be started until the next frame synchronous control period is started. Accordingly, much time is required until synchronizations of all the base stations are performed.

As explained above, the conventionally proposed inter-base-station frame synchronous systems have various kinds of disadvantages.

DISCLOSURE OF INVENTION

A first object of the present invention is to provide an inter-base-station frame synchronous system of a mobile communication system capable of simply performing frame synchronization between base stations by autonomous master-slave synchronization without using the control of a synchronous hierarchy, and also provide a base station apparatus applying this system thereto.

A second object of the present invention is to provide an inter-base-station frame synchronous system of a mobile communication system capable of performing frame synchronization without interrupting communication when a base station is on communication.

A third object of the present invention is to provide an inter-base-station frame synchronous system of a mobile communication system, which is little influenced by a propagation delay between base stations and a circuit delay within the base stations.

To achieve the first object, an inter-base-station frame synchronous system of the present invention comprises: plural base stations dispersively arranged within a service area and connected to a communication network, and having at least one master base station and plural slave base stations; and plural mobile stations wirelessly connected to the plural base stations by a time-division bidirectional multiplex system, wherein the master base station comprises: time information receiving means for receiving information with high precision externally supplied; reference frame timing generating means for generating reference frame timing for the time-division multiple connection in synchronization with predetermined synchronous setting timing set on the basis of the time information; and first control channel signal transmitting means for transmitting a control channel signal to the plural slave base stations located around its own station in synchronization with the reference frame timing, wherein the slave base stations comprise: control channel signal observation period setting means in which a predetermined period from a first receiving time point of a control channel signal transmitted from the master base station or other slave base stations is set to a control channel signal observation period; its own station frame timing generating means for generating its own station frame timing on the basis of receiving timing of the control channel signal transmitted from the master base station or one of the other slave base stations when only this control channel signal is received during the control channel signal observation period set by the control channel signal observation period setting means, the its own station frame timing generating means also generating its own station frame timing on the basis of one of receiving timings of control channel signals respectively transmitted from the master base station or plural slave base stations among the other slave base stations when these control channel signals are received during the control channel signal observation period; and second control channel signal transmitting means for transmitting each control channel signal in synchronization with the its own station frame timing after the control channel signal observation period is terminated. A base station apparatus dispersively arranged within a service area and used as a slave base station among plural base stations wirelessly connected to plural mobile stations by a time-division bidirectional multiplex system, the base station apparatus according to the present invention comprises: control channel signal observation period setting means in which a predetermined period from a-first receiving time point of a control channel signal transmitted from other base stations is set to a control channel signal observation period; its own station frame timing generating means for generating its own station frame timing on the basis of receiving timing of the control channel signal transmitted from one of the other base stations when only this control channel signal is received during the control channel signal observation period, the its own station frame timing generating means also generating its own station frame timing on the basis of one of receiving timings of control channel signals respectively transmitted from plural base stations among the other base stations when these control channel signals are received during the control channel signal observation period; and control channel signal transmitting means for transmitting each control channel signal in synchronization with the its own station frame timing after the control channel signal observation period is terminated.

In each of the above slave base stations, the its own station frame timing generating means generates its own station frame timing in synchronization with the frame timing of a most advanced phase among plural frame timings based on the respective receiving timings of the control channel signals respectively transmitted from the master base station or plural slave base stations among the other slave base stations when these control channel signals are received during the control channel signal observation period. In this system, when the control channel signals respectively transmitted from the master base station or plural slave base stations among the other slave base stations are received, the frame timing of a most advanced phase among the plural frame timings based on the respective receiving timings of these control channel signals is discriminated as first frame timing within a period set at a frame interval from a time point shifted by a time about half this frame interval from a first receiving time point of the control channel signals during the control channel signal observation period.

In each of the above slave base stations, as a different system for generating frame timing of its own station in the reception of control channel signals from plural base stations, the its own station frame timing generating means generates its own station frame timing based on receiving timing at a maximum receiving level among the control channel signals respectively transmitted from the master base station or plural slave base stations among the other slave base stations when these control channel signals are received during the control channel signal observation period. Further, this different system can be also constructed by a system, in which an average value of receiving levels of the received plural control channel signals is calculated every received plural control channel signals, and a control channel signal having the average value of receiving levels equal to or greater than a predetermined level is selected and the frame timing of its own station is generated on the basis of an average value of receiving timings.

To achieve the above first object, the base station apparatus of the present invention performs only signal reception for all times in a frame synchronous control period begun from the approximately same time point as predetermined synchronous setting timing of the master station to completion of the generation of the frame timing of at least its own station. A predetermined period from a first receiving time point of a control channel signal transmitted from other base stations during the above frame synchronous control period is set to a control channel signal observation period. The frame timing of its own station is generated on the basis of receiving timing of the control channel signal transmitted from one of the above other base stations when only this control channel signal is received during this control channel signal observation period. The frame timing of its own station is also generated on the basis of one of receiving timings of control channel signals respectively transmitted from plural base stations among the above other base stations when these control channel signals are received during the above control channel signal observation period. Each control channel signal is transmitted to the other base stations around its own station in synchronization with this generated its own station frame timing.

In accordance with these means, reference frame timing is generated in accordance with high precision time information in the master base station, and the control channel signal is transmitted to surrounding slave base stations in synchronization with this reference frame timing. In contrast to this, each slave base station performs only signal reception for all times in the frame synchronous control period from the approximately same time point as predetermined synchronous setting timing to the completion of generation of the frame timing of at least its own station. The frame timing of its own station is generated on the basis of the receiving timing of a control channel signal transmitted from other base stations during the control channel signal observation period as a predetermined period from a time point at which the control channel signal transmitted from the above other base stations is first received during this frame synchronous control period. The control channel is further transmitted to surrounding slave base stations in synchronization with this generated frame timing of its own station. Namely, a field of the frame synchronization is stepwise widened to the surrounding slave base stations in accordance with distances from the master base station.

Therefore, a frame synchronous operation using an autonomous connecting master-slave synchronous system without integrative calculation is performed so that time required to perform the synchronization is shortened.

Further, for example, the generating operation of the reference frame timing in the master base station and the frame synchronous control operation in each slave base station are intermittently performed every 24 hours. Therefore, it is not necessary to receive the control channel signal for the frame synchronization transmitted from a base station on an upper hierarchical side at any time. Accordingly, no dedicated receiver for the frame synchronization is required so that the construction of a base station is simply made compact and cost of a product can be reduced. Further, it is not necessary to control the hierarchy of its own station at any time and transmit this hierarchy together with a control signal at any time so that control can be correspondingly simplified.

To achieve the second object, the inter-base-station frame synchronous system of the present invention is provided that, when the communication between base and mobile stations is approximately performed at the same time point as ordinary frame synchronous control period, the frame synchronous system further comprises frame synchronous starting extending means for setting a frame synchronous control period after the communication between base and mobile stations is terminated, in the slave base stations.

Accordingly, when starting of the frame synchronous control period is delayed, it is desirable that the second control channel signal transmitting means adds information showing whether the communication between base and mobile stations is performed or not or information showing whether it is suitable as reference of the frame synchronous control or not to the control channel signal, and the control channel signal with the information is transmitted to the other slave base stations.

When the starting of the frame synchronous control period is delayed, its own station frame timing generating means desirably generates its own station frame timing based on the receiving timing of only a control channel signal to which information showing that the communication between base and mobile stations is performed or information prohibiting becoming to reference of the frame synchronous control, is not added. Further, the frame synchronous system further comprises talking connection request reception inhibiting means for inhibiting the reception of a talking connection request in at least a frame synchronous control period.

In accordance with such means, when the ordinary frame synchronous control period is started on communication, communication is preferentially performed and the frame synchronous control is performed after this communication is terminated. Therefore, no disadvantages of intermediate interruption of the communication are caused. Further, extending information of the starting of the frame synchronous control is contained to a control channel signal from a slave base station in which the base station is on communication and so the starting of the frame synchronous control is extended. This information is then transmitted from this slave base station. Therefore, in surrounding slave base stations, the above control channel signal, i.e., a signal showing that no frame synchronization is terminated, can be removed from a signal for the frame synchronization. Thus, its own station frame timing can be generated in correct timing at any time.

To achieve the third object, the inter-base-station frame synchronous system of the present invention has timing adjusting means in the second control channel signal transmitting means of a slave base station. In this timing adjusting means, transmitting timing of the control channel signal is variably set on the basis of supposed delay information.

The timing adjusting means variably sets the transmitting timing such that a total time of a supposed propagation delay time from a base station transmitting the control channel signal to its own station, a detecting time required from a receiving time point of this control channel signal to the detection of frame timing shown by this control channel signal, a generating time required from a detecting time point of this frame timing to the generation of its own station frame timing, and a transmitting time until the control channel signal is transmitted in synchronization with this generated its own station frame timing, is an substantially integer times a frame period.

In this case, the propagation delay time is fixedly set to zero or a predetermined value in each slave base station. Otherwise, the propagation delay time is set to be indefinite. The timing adjusting means presumes the propagation delay time of the control channel signal used to generate its own station frame timing on the basis of a receiving level of the received control channel signal. Further, it is possible to apply a system for presuming the propagation delay time of the control channel signal on the basis of a receiving level of the control channel signal used to generate frame timing, and information showing a transmitting level transmitted from a base station on a transmitting side in this control channel, or information of the transmitting level correspondingly stored to this base station in preset transmitting level information every time the control channel signal used to generate the frame timing is received. It is desirable, when the propagation delay time of this control channel signal is presumed on the basis of only the receiving level of the control channel signal, the transmitting level of the control channel signal is set to the same level in each of the master base station and the slave base stations. Further, the timing adjusting means presumes the propagation delay time of the control channel signal used to generate its own station frame timing on the basis of a receiving level of the received control channel signal and information showing a transmitting level transmitted from a base station on a transmitting side in this control channel signal, and transmitting level information storing means for storing transmitting level information showing a transmitting level of the control channel signal in each of the plural base stations, wherein in the received control channel signal used to generate its own station frame timing, the timing adjusting means judges the transmitting level of the received control channel signal with reference to the transmitting level information stored to the transmitting level information storing means on the basis of discriminating information of a base station on a transmitting side transmitted from the base station on the transmitting side in the control channel signal, and presumes the propagation delay time of this control channel signal from the transmitting level and the receiving level.

In accordance with such means, the timing adjusting means is arranged in the second control channel signal transmitting means of each slave base station, and the transmitting timing of the control channel signal is variably set by this timing adjusting means on the basis of the supposed delay information. Therefore, the frame synchronization can be performed with higher precision in consideration of a propagation delay between base stations and a circuit delay generated within the base stations.

As mentioned above in detail, the inter-base-station frame synchronous system of the present invention has at least one master base station and plural slave base stations arranged around this master base station. In the master base station, reference frame timing for a time division bidirectional multiplex is generated in a predetermined synchronous setting time intermittently set on the basis of high precision time information externally received. A predetermined control channel signal is transmitted to the above slave base stations located around its own station in synchronization with this generated reference frame timing. Further, in each slave base station, only signal reception is performed for all times in a frame synchronous control period from the approximately same time point as the above synchronous setting time of the master station to the completion of generation of the frame timing of at least its own station. A predetermined period from a first receiving time point of the control channel signal transmitted from the above master base station or other slave base stations during the above frame synchronous control period is set to a control channel signal observation period. When only the control channel signal transmitted from the above master base station or one of the other slave base stations is received during this control channel signal observation period, the frame timing of its own station is generated on the basis of receiving timing of this control channel signal. When plural control channel signals respectively transmitted from the above master base station or slave base stations among the other slave base stations are received during the control channel signal observation period, the frame timing of its own station is generated on the basis of one of receiving timings of these control channel signals. Each control channel signal is transmitted in synchronization with this generated its own station frame timing.

In the base station apparatus of the present invention, only signal reception is performed for all times in a frame synchronous control period from the approximately same time point as predetermined synchronous setting time of the master station to the completion of generation of the frame timing of at least its own station. A predetermined period from a first receiving time point of a control channel signal transmitted from other base stations during the above frame synchronous control period is set to a control channel signal observation period. When only the control channel signal transmitted from one of the other base stations is received during this control channel signal observation period, the frame timing of its own station is generated on the basis of receiving timing of this control channel signal. When control channel signals respectively transmitted from plural base stations among the other base stations are received during the control channel signal observation period, the frame timing of its own station is generated on the basis of one of receiving timings of these control channel signals. Each control channel signal is transmitted in synchronization with this generated its own station frame timing.

Accordingly, it is possible to provide an inter-base-station frame synchronous system of a mobile communication system capable of simply performing the frame synchronization between base stations by autonomous master-slave synchronization without using the control of a synchronous hierarchy, and also provide a base station apparatus applying this system thereto.

Further, in the inter-base-station frame synchronous system of the present invention, when communication is performed between base and mobile stations approximately at the same time point as the ordinary frame synchronous control period in a slave base station, the frame synchronous control period of the slave base station is established after this communication between base and mobile stations is terminated. Accordingly, it is possible to provide an inter-base-station frame synchronous system of a mobile communication system capable of performing the frame synchronization without interrupting communication when the base station is on communication.

Further, in the inter-base-station frame synchronous system of the present invention, timing adjusting means is arranged in the second control channel signal transmitting means of a slave base station. Transmitting timing of the control channel signal is variably set in this timing adjusting means on the basis of supposed delay information. Accordingly, it is possible to provide an inter-base-station frame synchronous system of a mobile communication system, which is not easily influenced by a propagation delay between base stations and a circuit delay within the base stations.

BEST MODE OF CARRYING OUT THE INVENTION

An embodiment of the present invention will next be explained with reference to the drawings.

Figure 1:
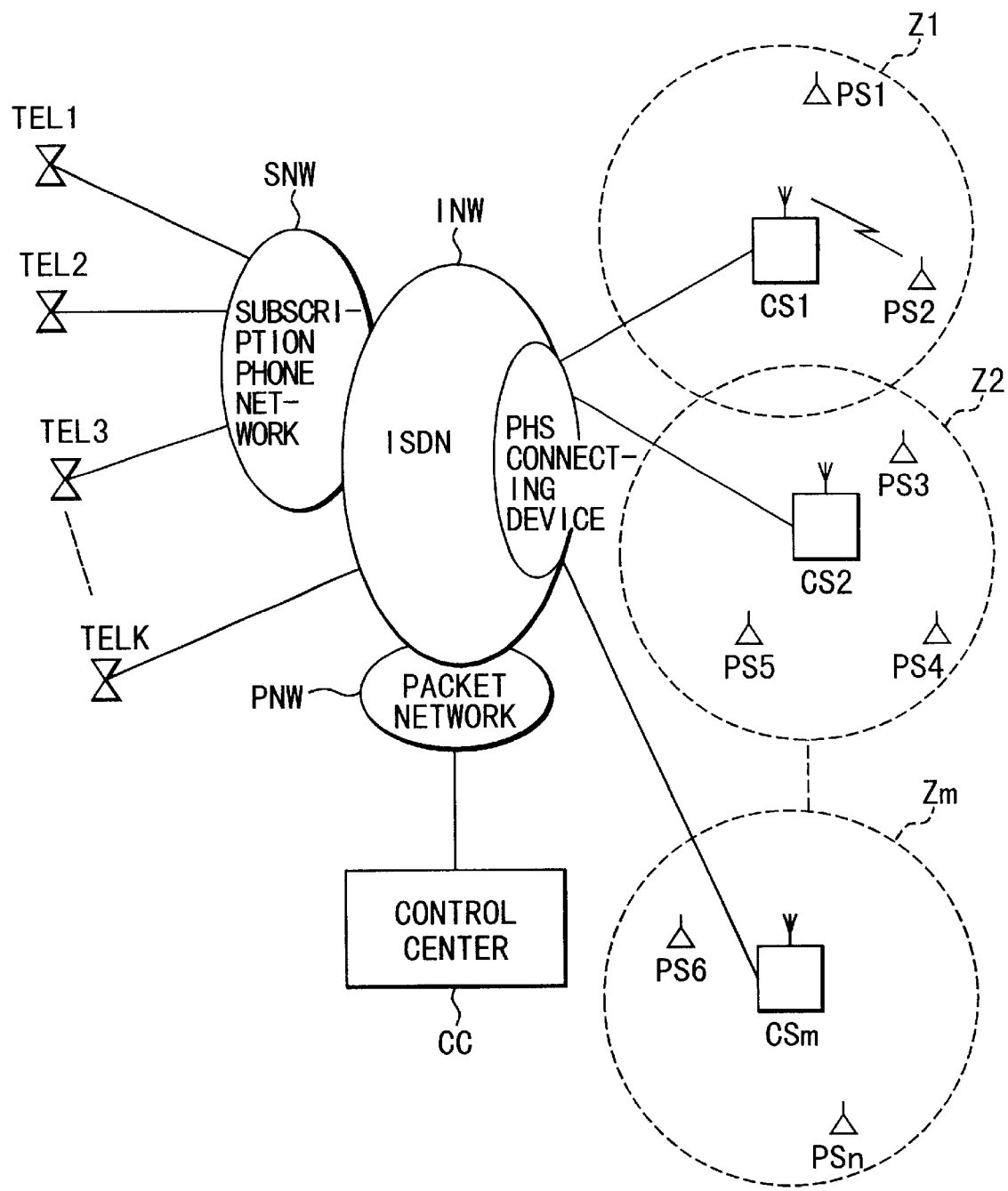
FIG. 1 is a schematic view showing the basic construction of a PHS.
Figure 2:
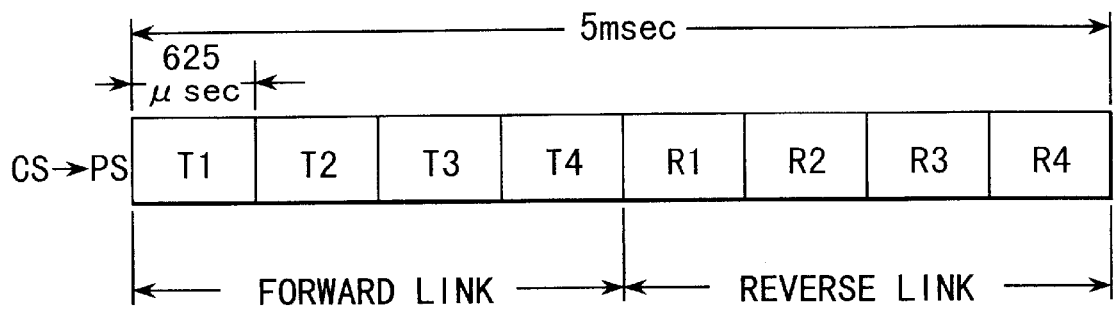
FIG. 2 is a view showing one example of the frame construction of a TDMA-TDD system.
Figure 3:
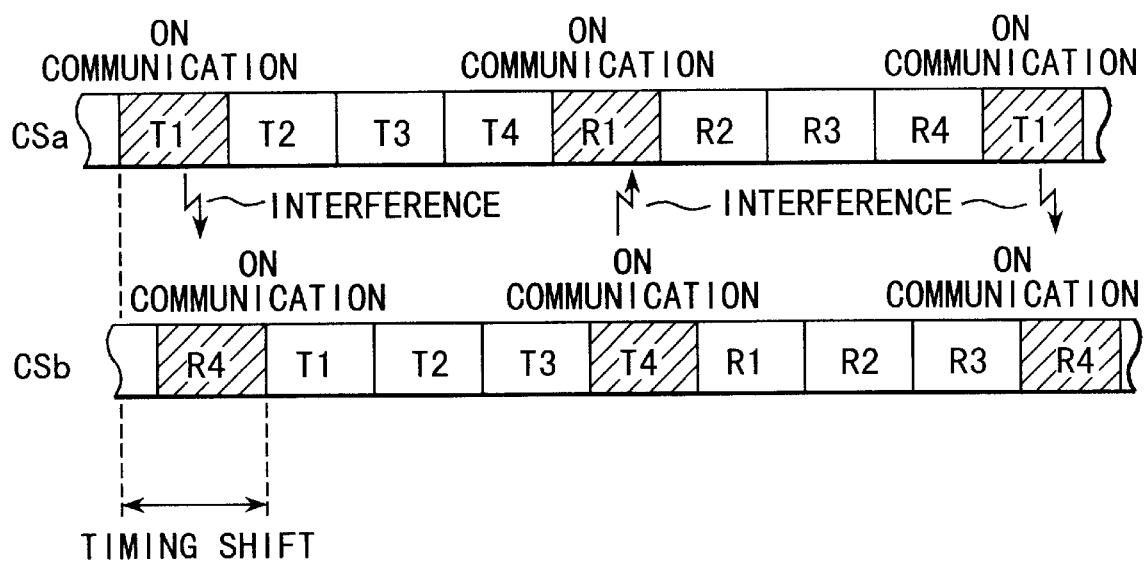
FIG. 3 is a view used to explain problem points of a conventional PHS system.
Figure 4:
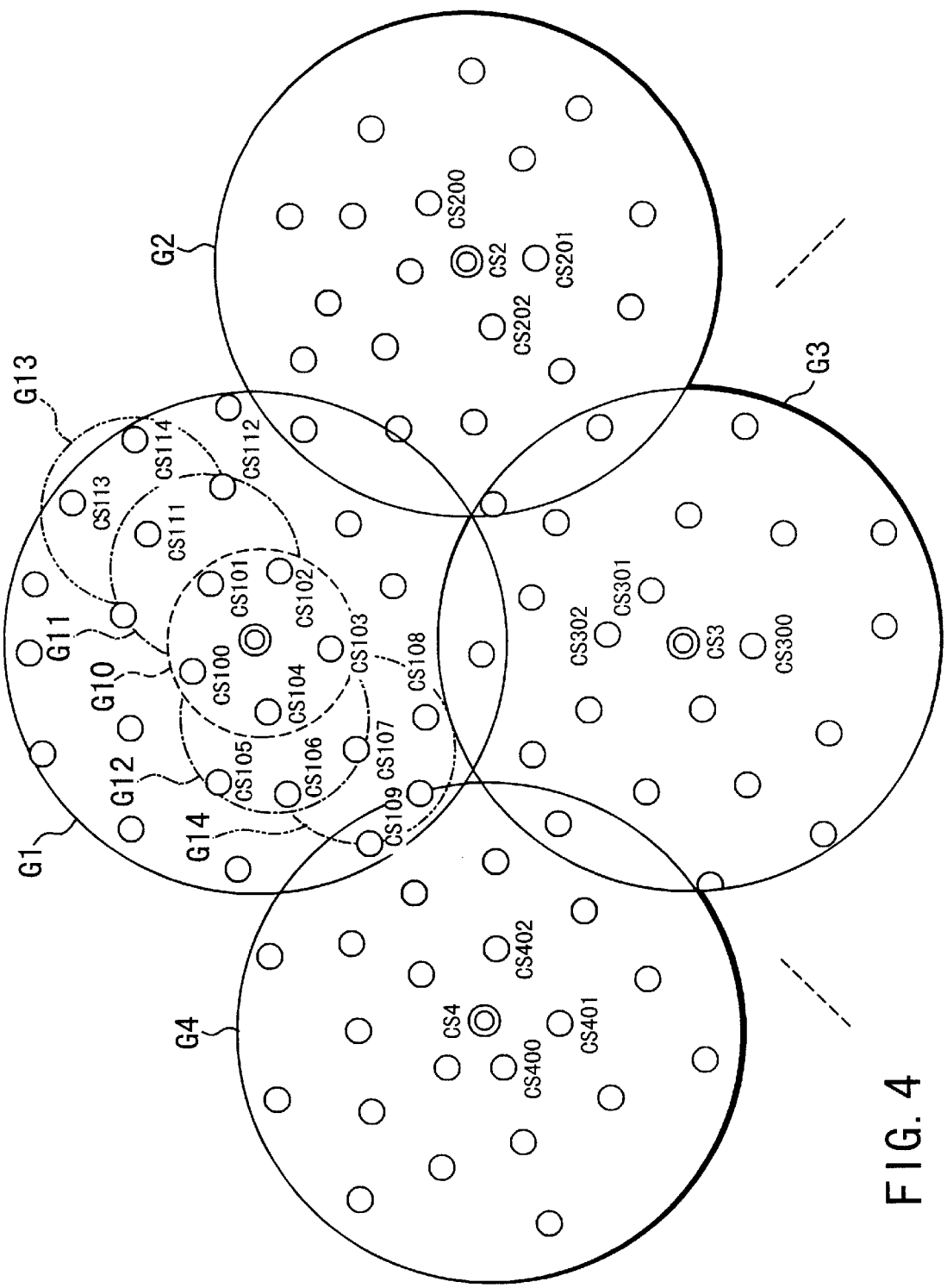
FIG. 4 is a schematic view showing the arranging construction of base stations in a mobile communication system in accordance with an embodiment of the present invention.

FIG. 4 is a layout plan of base stations in a mobile communication system in accordance with one embodiment of the present invention.

In FIG. 4, a service area of this system is divided into small service areas G1, G2, . . . One master station CS1, CS2, . . . , and many slave base stations CS100, CS200, . . . , are arranged in each of these small service areas G1, G2 . . . Arranging positions of the master base stations CS1, CS2, . . . , are set to be approximately located in central portions of the small service areas G1, G2, . . .

The above master base stations CS1, CS2, . . . , and the respective slave base stations CS100, CS200, . . . , form wireless zones each having a radius from about 100 to about 500 m. Wireless transmission using a TDMA-TDD system is performed between these base stations and unillustrated mobile stations existing within these wireless zones. Each of the above base stations is connected to an unillustrated ISDN as one digital public network through an ISDN subscriber line, and is further connected to an unillustrated control center of this system through this ISDN. The control center performs management and control such as register, authentication, accounting processing, etc. with respect to the mobile station subscribing to this system.

When this system is a system for a business place, each base station is connected to a digital private branch exchange through a digital extension.

The above master base stations CS1, CS2, . . . , and the slave base stations CS100, CS200, . . . , are respectively constructed as follows.

Figure 5:
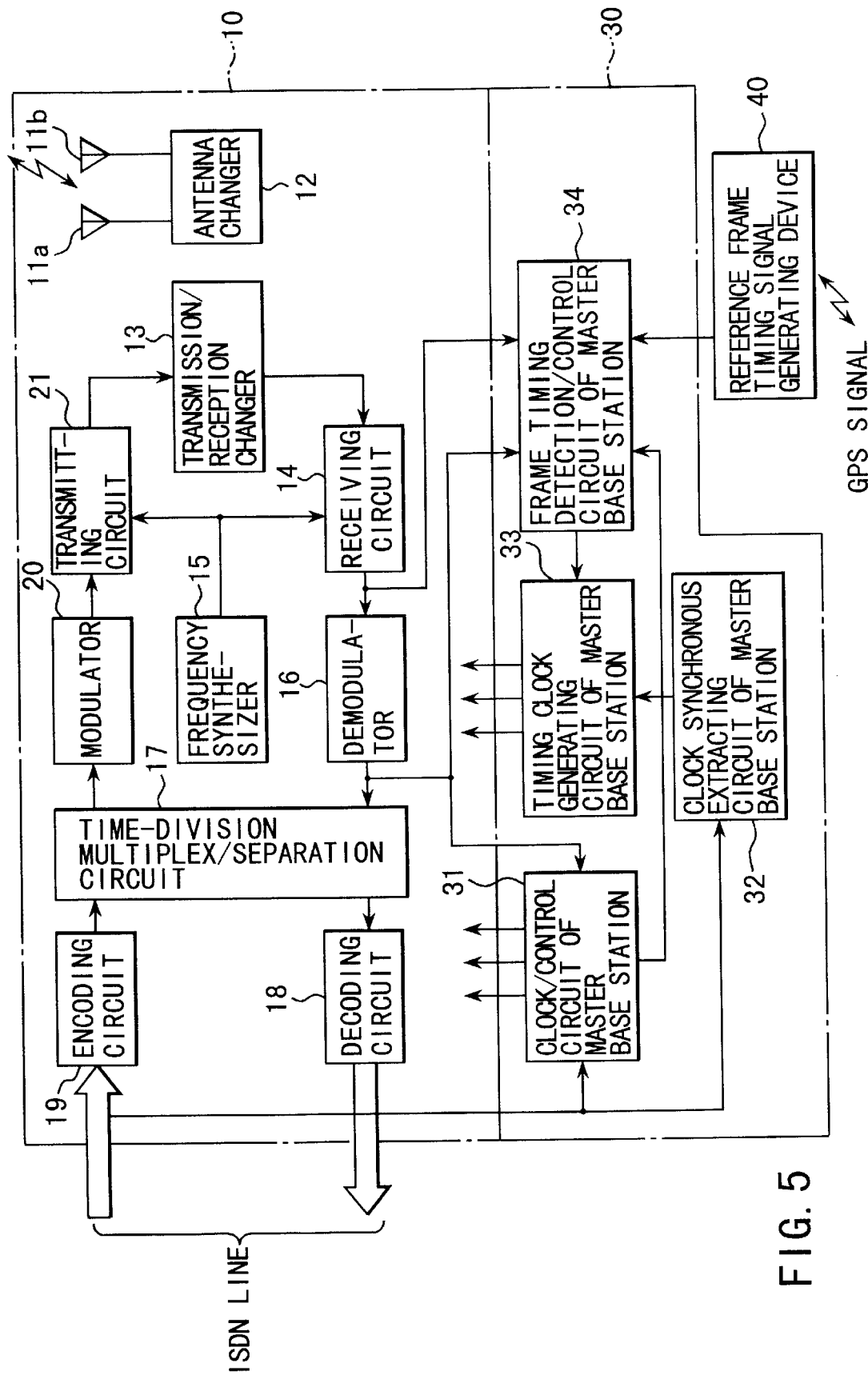
FIG. 5 is a circuit block diagram showing the construction of a master base station in the system shown in FIG. 4.

FIG. 5 is a block diagram showing each of circuit constructions of the master base stations CS1, CS2, . . . , among these base stations. Each of the master base stations CS1, CS2, . . . , is constructed by a transmitting/receiving section 10, a control section 30 and a reference frame timing signal generating device 40.

For example, the transmitting/receiving section 10 has two antennas 11a, 11b to perform space diversity. A wireless modulating wave signal from the mobile station received by these antennas 11a, 11b is selected by an antenna changer 12 and is then inputted to a receiving circuit 14 through a transmission/reception changer 13. In the receiving circuit 14, the above wireless modulating wave signal is mixed with a local oscillating signal corresponding to a wireless channel generated from a frequency synthesizer 15 and is converted to an intermediate frequency signal. This received intermediate frequency signal is digitally demodulated by a demodulator 16 and is then separated in a time-division multiplex/separation circuit 17 every slot. Error correcting decoding processing and voice decoding processing of this separated demodulating signal are performed by a decoding circuit 18 so that regenerated voice data are transmitted to an ISDN line.

In contrast to this, voice encoding processing and error correcting encoding processing of the voice data transmitted from the ISDN line are performed by an encoding circuit 19 and are then inputted to the time-division multiplex/separation circuit 17. In this time-division multiplex/separation circuit 17, the voice data are slot-multiplexed together with voice data of another channel. These multiplexed transmission data are inputted to a modulator 20, are converted to a digital modulating signal in this modulator 20 and then are inputted to a transmitting circuit 21. In the transmitting circuit 21, the above digital modulating signal is mixed with the local oscillating signal corresponding to the wireless channel generated from the frequency synthesizer 15 and is frequency-converted to a wireless modulating wave signal. This wireless modulating wave signal is supplied to the antennas 11a, 11b through the transmission/reception changer 13 and the antenna changer 12 and is transmitted toward the mobile station from these antennas 11a, 11b.

The reference frame timing signal generating device 40 receives time information transmitted from a system capable of obtaining time information with high precision, e.g., a satellite position measuring system (GPS). The reference frame timing signal generating device 40 generates a frame timing signal as a reference at a predetermined time on the basis of this received time information. Here, a generating time of this reference frame timing signal is set in a time zone providing a lowest communication traffic in a master base station. For example, this generating time is selectively set to two o'clock in the morning. Namely, the reference frame timing signal generating device 40 refreshes and generates reference frame timing every arrival at two o'clock every day.

The control section 30 has a clock/control circuit 31, a clock synchronous extracting circuit 32, a timing clock generating circuit 33 and a frame timing detection/control circuit 34.

The clock/control circuit 31 receives a control signal from the control center and the mobile station and controls the operation of an entire base station. The clock/control circuit 31 also has a function for receiving time information in a preset period from the control center and performing a timing operation based on this time information. The above time information is used to set the synchronous setting period, etc. and does not require high precision as in time information with high precision used to generate the reference frame timing signal by the above reference frame timing signal generating device 40. Accordingly, there is no problem with respect to a delay time from the control center to the base station through the ISDN.

For example, the clock synchronous extracting circuit 32 is constructed by a PLL circuit and generates a clock frequency in synchronization with a signal clock transmitted from the ISDN through the ISDN line. At this time, the frequency of clocks sent from the ISDN to the respective ISDN lines are synchronized so that all the base stations can be operated by the same clock frequency.

The frame timing detection/control circuit 34 sets reference frame timing in synchronization with the reference frame timing signal generated from the above reference frame timing signal generating device 40.

The timing clock generating circuit 33 is clock-synchronized with the clock extracted from the above clock synchronous extracting circuit 32, and generates an internal operating clock of the master base stations in synchronization with the reference frame timing generated in the above frame timing detection/control circuit 34.

When the reference frame timing is set in the above frame timing detection/control circuit 34, each of the master base stations CS1, CS2, . . . , transmits a control channel signal on the basis of the control of the clock/control circuit 31 toward surrounding slave base stations in timing synchronized with the above reference frame timing.

Figure 6:
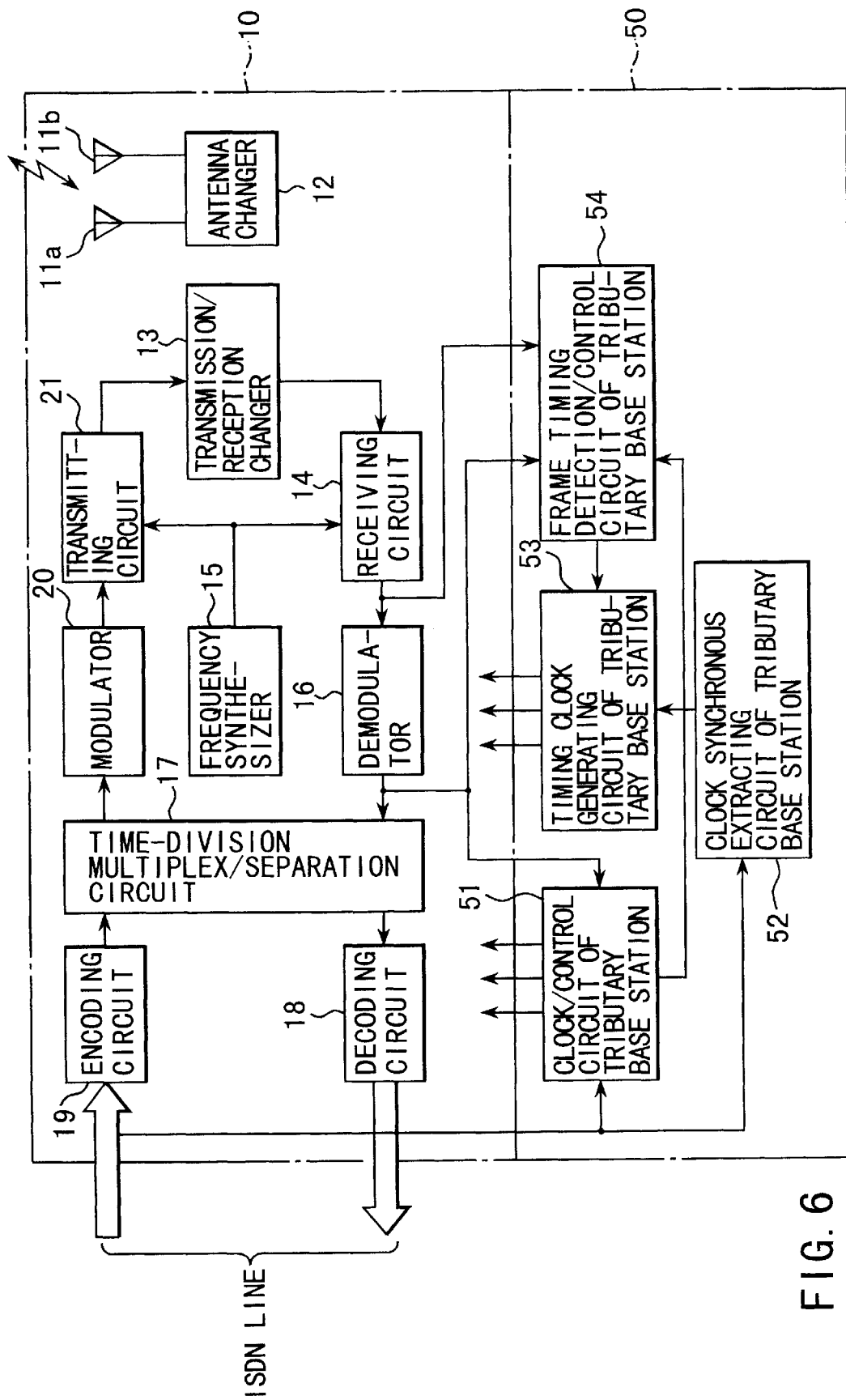
FIG. 6 is a circuit block diagram showing the construction of a slave base station in the system shown in FIG. 4.

FIG. 6 is a block diagram showing each of circuit constructions of the slave base stations CS100, CS200, . . . In FIG. 6, the same portions as FIG. 5 are designated by the same reference numerals and a detailed explanation thereof is omitted in the following description.

Each of the slave base stations CS100, CS200, . . . , has a transmitting/receiving section 10 and a control section 50. The control section 50 has a clock/control circuit 51, a clock synchronous extracting circuit 52, a timing clock generating circuit 53 and a frame timing detection/control circuit 54.

Similar to the clock/control circuit 31 of each of the above master base stations CS1, CS2, . . . , the clock/control circuit 51 receives a control signal from the control center and the mobile station and controls the operation of an entire base station. The clock/control circuit 51 also receives time information in a preset period from the control center and performs a timing operation based on this time information, and sets a constant period from two o'clock in the morning to the frame synchronous control period. Further, the clock/control circuit 51 has a talk connecting request reception inhibiting function for inhibiting the reception of a talk connecting request generated during a frame synchronous control period and preventing communication from being started during the frame synchronous control period.

Similar to the clock synchronous extracting circuit 32 of each of the above master base stations CS1, CS2, . . . , the clock synchronous extracting circuit 52 generates a clock frequency in synchronization with a signal clock transmitted from an ISDN through an ISDN line by using a PLL circuit.

The frame timing detection/control circuit 54 has a setting function of a control channel signal observation period and a setting function of frame timing of its own station.

Figure 7:
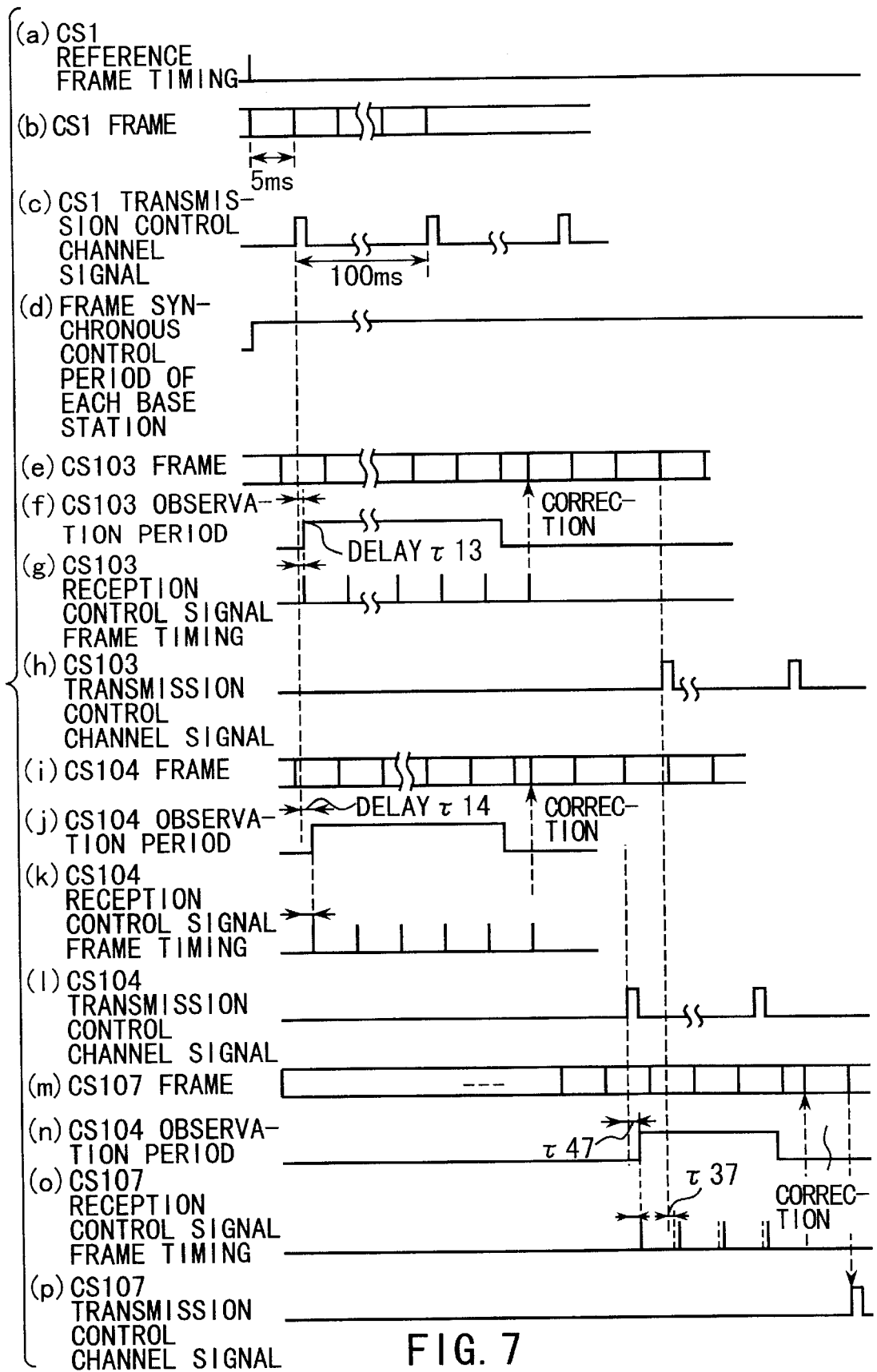
FIG. 7 is a timing chart for explaining a frame synchronous operation between base stations in the system shown in FIG. 4.

Here, in the setting function of the control channel signal observation period, after the beginning of the frame synchronous control period, two o'clock in the morning, the control channel signal observation period is started from a time point at which a control channel signal transmitted from another base station CS is first received. For example, as shown in FIG. 7, a time length of this control channel signal observation period is set to be longer than a transmitting period (e.g., 100 ms) of the control channel signal (e.g., several times to several ten times the transmitting period of the control channel signal).

In the setting function of the frame timing of its own station, the frame timing of its own station is generated on the basis of reception timing of the control channel signal in the control channel signal observation period. In this case, when control channel signals from plural base stations are received, one control channel signal is selected from these control channel signals and the frame timing of its own station is set on the basis of reception timing of this selected control channel signal.

Similar to the timing clock generating circuit 53 of each of the above master base stations CS1, CS2, . . . , the timing clock generating circuit 53 is clock-synchronized with the clock extracted by the above clock synchronous extracting circuit 52, and generates an internal operating clock of the slave base stations in synchronization with reference frame timing generated in the above frame timing detection/control circuit 54.

Further, the clock/control circuit 51 has a transmitting control function of a control channel signal for setting frame timing. In this transmitting control function, when the frame timing of its own station is set in the above frame timing detection/control circuit 54, the control channel signal for setting the frame timing is transmitted to surrounding slave base stations in timing synchronized with this frame timing of its own station. The transmitting control function of this control channel signal is constructed in detail by a control channel signal generating function and a transmission timing adjusting function. In the control channel signal generating function, the control channel signal is generated in a predetermined form including ID of its own station and information showing whether or not this station is on communication, etc. In the transmission timing adjusting function, transmission timing of the control channel signal generated by this control channel signal generating function is adjusted to optimum timing in which a propagation delay of the control channel signal between the base stations and a circuit processing delay within the base stations, etc. are optimum.

The inter-base-station frame synchronous system of the system having the above construction will next be explained. Here, a small service area G1 among the small service areas G1, G2, . . . , shown in FIG. 4 will be explained as an example. FIGS. 7 to 10 are timing charts used to explain an operation of this inter-base-station frame synchronous system.

First, in a master base station CS1, when a time shown by high precision time information transmitted from a GPS is two o'clock in the morning as a synchronous setting time, a reference frame timing signal is generated in the reference frame timing signal generating device 40 as shown in FIG. 7(a). Thus, a frame in the master base station CS1 is set as shown in FIG. 7(b) in the frame timing detection/control circuit 34 on the basis of the above reference frame timing signal. For example, as shown in FIG. 7(c), a control channel signal is generated in timing synchronized with this frame and is transmitted to surrounding slave base stations CS100, CS101, . . .

Figure 8:
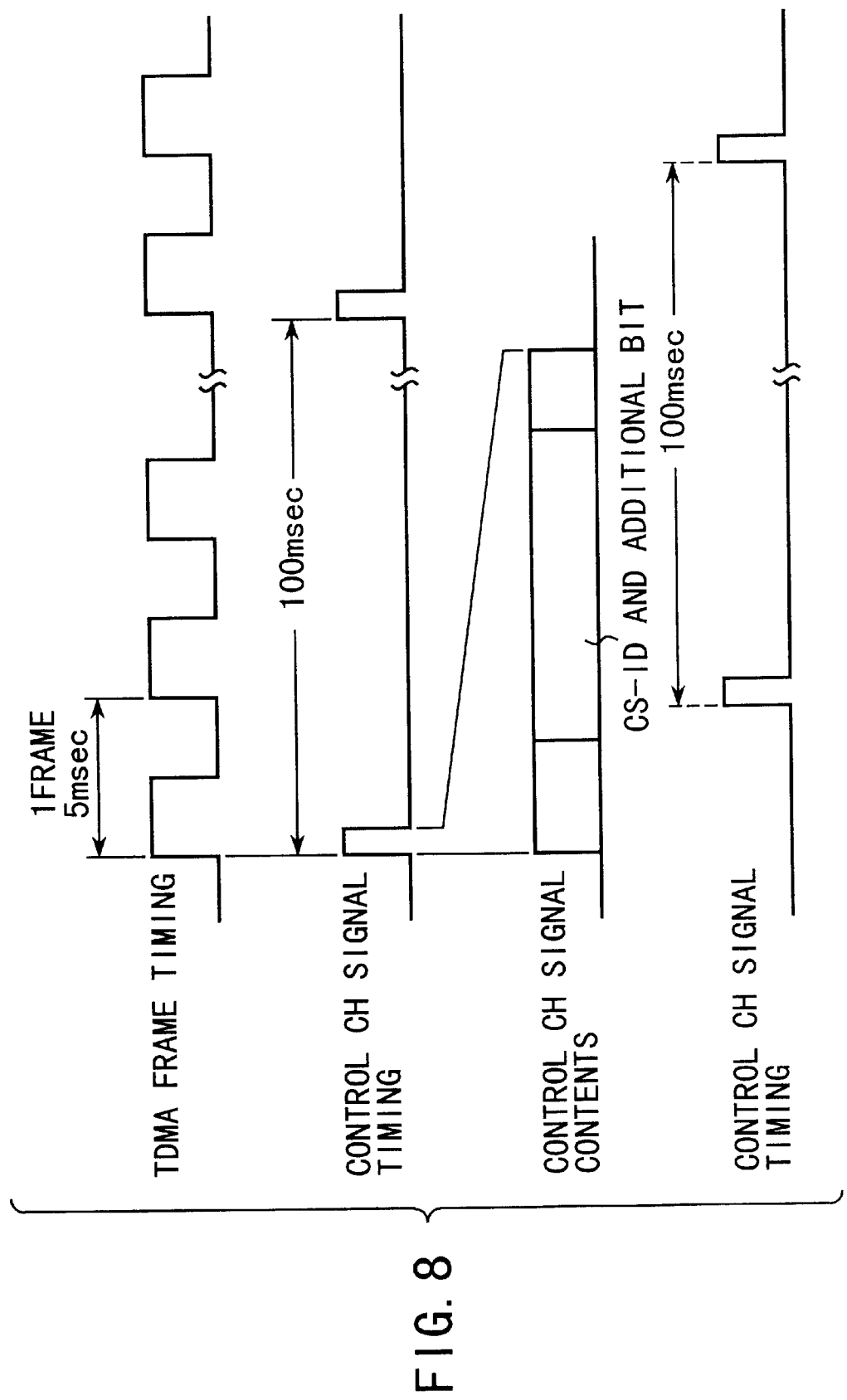
FIG. 8 is a timing chart showing an example of the transmitting operation of a control channel signal.

For example, as shown in FIG. 8, a transmitting period of this control channel signal is set to a period of 20 frames, i.e., 100 ms. Further, as shown in FIG. 8, a CS-ID signal showing a base station number and an additional bit are included in the control channel signal.

In contrast to this, a frame synchronous control period is started in each of the slave base stations CS100, CS101, . . . , when the present time clocked in the clock/control circuit 51 becomes two o'clock in the morning as the above synchronous setting time. Each of the slave base stations CS100, CS101, . . . , is first set to a mode for performing only signal reception in all periods including a forward link of a TDMA frame when the frame synchronous control period is started. In this frame synchronous control period, synchronization spreads from the master base station CS1 to the surrounding slave base stations. This frame synchronous control period desirably includes a period from the master base station CS1 until synchronization reaches a farthest base station. However, this period may be sequentially terminated from base stations in which synchronization is terminated.

It is now assumed that a wireless zone of the master base station CS1 is set to G10 of FIG. 4. In this case, a control channel signal for setting frame timing transmitted from the master base station CS1 is received in each of slave base stations CS100 to CS104 located within the above wireless zone G10.

When a control channel signal at a constant level or more is first received after the frame synchronous control period is started, the clock/control circuit 51 sets a constant period from this timing to an observation period of the control channel signal in each of the slave base stations CS100 to CS104, and stores reception timing of the control channel signal. Here, the observation period of the control channel signal is desirably set to be longer than a transmitting interval (100 ms) of the control channel signal.

When the control channel signal observation period is terminated, the frame timing detection/control circuit 54 selects suitable one of timings stored to the clock/control circuit 51. The frame timing detection/control circuit 54 corrects the frame timing of its own station such that this frame timing of its own station is synchronized with the selected timing. The frame timing detection/control circuit 54 then performs a frame synchronous operation. When the frame synchronous operation has been performed, all receiving modes are released and the control channel signal is transmitted in synchronization with the set frame timing. At this time, the control channel signal in each of the slave base stations CS100 to CS104 belonging to which frame is a frame among 20 frame periods is set at random. Therefore, collision probability of the control channel signal in each slave base station on a wireless line is low. When control channel signals come into collision with each other, the control channel signal is reset in a corresponding base station.

When the above slave base stations CS100 to CS104 transmit the control channel signals, these control channel signals are received in other slave base stations arranged within wireless zones of the respective slave base stations CS100 to CS104. For example, as shown in FIG. 4, a control channel signal transmitted from the slave base station CS101 is received by each of slave base stations CS110 to CS112 existing within a wireless zone G11 of this slave base station CS101. Similarly, a control channel signal transmitted from the slave base station CS104 is received by each of slave base stations CS105 to CS107 existing within a wireless zone G12 of this slave base station CS104.

In each of these slave base stations CS110 to CS112 and CS105 to CS107, the control channel signal transmitted from each of the slave base stations CS100 to CS104 is first received after the frame synchronous control period is started. Then, the frame synchronization is performed and the control channel signal is transmitted by operations similar to those of the slave base stations CS100 to CS104.

When the respective slave base stations CS110 to CS112 and CS105 to CS107 transmit the control channel signals, these control channel signals are respectively received in other slave base stations arranged within wireless zones of the slave base stations CS110 to CS112 and CS105 to CS107. For example, as shown in FIG. 4, a control channel signal transmitted from a slave base station CS111 is received by each of slave base stations CS113, CS114 existing within a wireless zone G13 of this slave base station CS111.

Similarly, a control channel signal transmitted from a slave base station is sequentially transmitted to slave base stations farther than this slave base station and the frame synchronization is performed in synchronization with this received control channel signal.

Namely, in each slave base station, the hierarchy of its own station is autonomously set in accordance with a distance from each of the master base stations CS1, CS2, - - - . Thus, the frame synchronous operation is performed by the autonomous connecting master-slave synchronous system.

Each slave base station immediately starts the frame synchronous operation if the frame synchronization of an upper base station is performed and a control channel signal transmitted from this base station is received. Accordingly, in comparison with Jpn. Pat. Appln. KOKAI Publication No. 8-289359, the frame synchronous operation can be efficiently performed and it is possible to shorten a time required until the frame synchronizations of all the base stations are performed.

In the frame synchronous system in this embodiment, the following various kinds of characterized controls are performed when the above frame synchronization setting operation is performed. First, a setting function of the frame timing of its own station will be explained when control channel signals from plural base stations are received.

For example, only a control channel signal of the master base station CS1 is received in slave base stations CS103, CS104 located within the wireless zone G10 of the master base station CS1 (transmitting delays τ13, τ14 are respectively caused). Therefore, only one kind of frame timing can be taken as shown in each of FIGS. 7(g) and 7(k). Accordingly, as shown in each of FIGS. 7(e) and 7(i), in the slave base stations CS103, CS104, the frame timing of its own station is synchronized with receiving frame timing based on the control channel signal of the master base station CS1.

However, as shown in each of FIGS. 7(h) and 7(l), when the slave base stations CS103, CS104 begin to transmit control channel signals, a slave base station CS107 existing in a position relatively near these slave base stations CS103, CS104 receives the control channel signals (transmitting delays τ37, τ47 are respectively caused) transmitted from the above respective slave base stations CS103, CS104. Accordingly, as shown in FIG. 7(o), two kinds of frame timings can be taken. Therefore, the slave base station CS107 detects a receiving level of each of the received control channel signals and selects a control channel signal having a larger receiving level. The frame timing of its own station is set on the basis of reception timing of this selected control channel signal and the control channel signal is transmitted in timing synchronized with this frame timing. For example, if the receiving level of the control channel signal of the slave base station CS103 is larger in the slave base station CS107, the slave base station CS107 corrects the frame timing of its own station such that this frame timing of its own station is synchronized with the reception timing of the control channel signal of the slave base station CS103 as shown in FIG. 7(m). Further, the slave base station CS107 transmits the control channel signal in synchronization with the corrected frame timing of its own station as shown in FIG. 7(p).

A method for calculating an average value of the reception timing of each control channel signal and setting the frame timing of its own station based on this average value, and a method for calculating an average multiplied by a weight at a receiving level are considered as another method of setting its own station frame timing setting function when plural control channel signals are received.

Further, there is a method for selecting a path of synchronization considered as a shortest distance. Namely, this method selects a path of synchronization in which a signal reaches in earliest timing seen in a frame unit.

This method will next be explained with reference to FIG. 9. As mentioned above, the control channel signal of a slave base station CS103 is delayed by a transmitting delay τ37 as shown in FIGS. 9(a) and 9(b) and is received by a slave base station CS107. The control channel signal of a slave base station CS104 is delayed by a transmitting delay τ47 as shown in FIGS. 9(c) and 9(d) and is received by the slave base station CS107.

Figure 9:
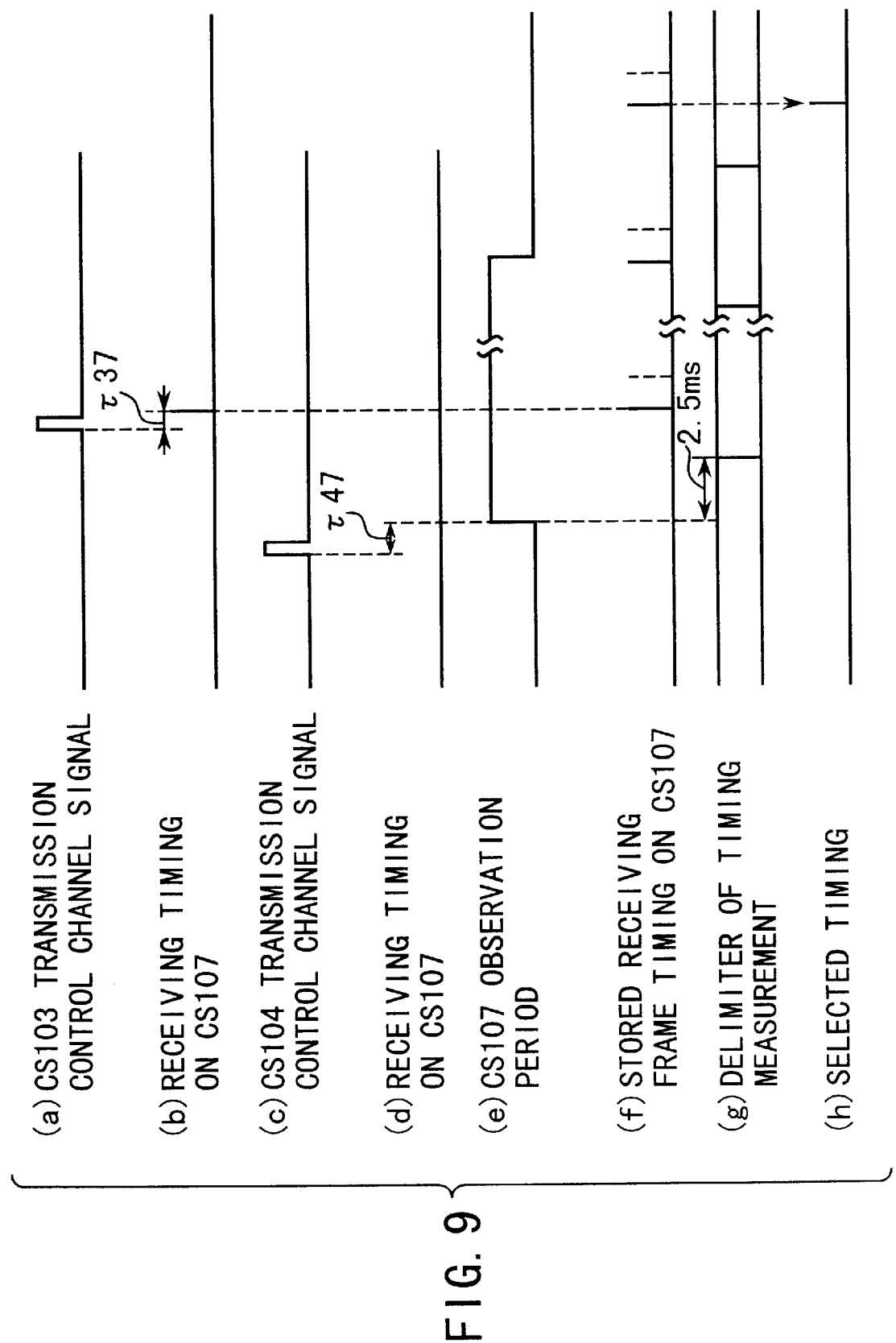
FIG. 9 is a timing chart for explaining processing for selecting receiving timing of the control channel signal reaching in earliest timing seen in a frame unit.

In the example of FIG. 9, the control channel signal of the slave base station CS104 is received earlier in time. However, when these control channel signals are seen in repetitions of the frame unit, these control signals are provided as shown in FIG. 9(f). In this case, it is difficult to judge which one of these control channel signals reaches earlier within a frame in accordance with a frame delimiter of the slave base station CS107. However, the difference in timing between these control channel signals is about 3.3 μs when the difference between signal paths connecting frame synchronizations to each other in synchronization is 1 km. Accordingly, the difference in reception timing between the control channel signal of the slave base station CS103 and the control channel signal of the slave base station CS104 is sufficiently small seen from a frame interval (5 ms). Therefore, it can be said that the reception timings of the respective control channel signals are set in a gathering state within a short time within the frame.

Therefore, earliest reception timing among the reception timings in the gathering state is set to timing having a smallest delay from the frame timing of the master base station CS1 so that synchronization is performed in this timing. As an example of concrete realization, timing having the same interval (5 ms) as the frame and shifted by a half frame from a starting time point of the control channel signal observation period is set as a delimiter for timing measurement, as shown in FIG. 9(g). When the control channel signal observation period is terminated, timing able to be judged as earliest timing within this delimiter is selected and is set to frame timing of its own station.

It is desirable that the delimiter for timing measurement is shifted by a half frame from the center of a continuing period in the gathering state of the reception timings. However, a continuing time of the gathering state of the reception timings is sufficiently shorter than the frame interval. Accordingly, no shifting amount from the center of a continuing period in the gathering state may be strictly set to a half frame value. Therefore, this shifting amount may be approximately set to the half frame value. As mentioned above, the delimiter may be determined with the starting time point of the control channel signal observation period, i.e., a first control channel signal receiving time point as a reference.

Figure 10:
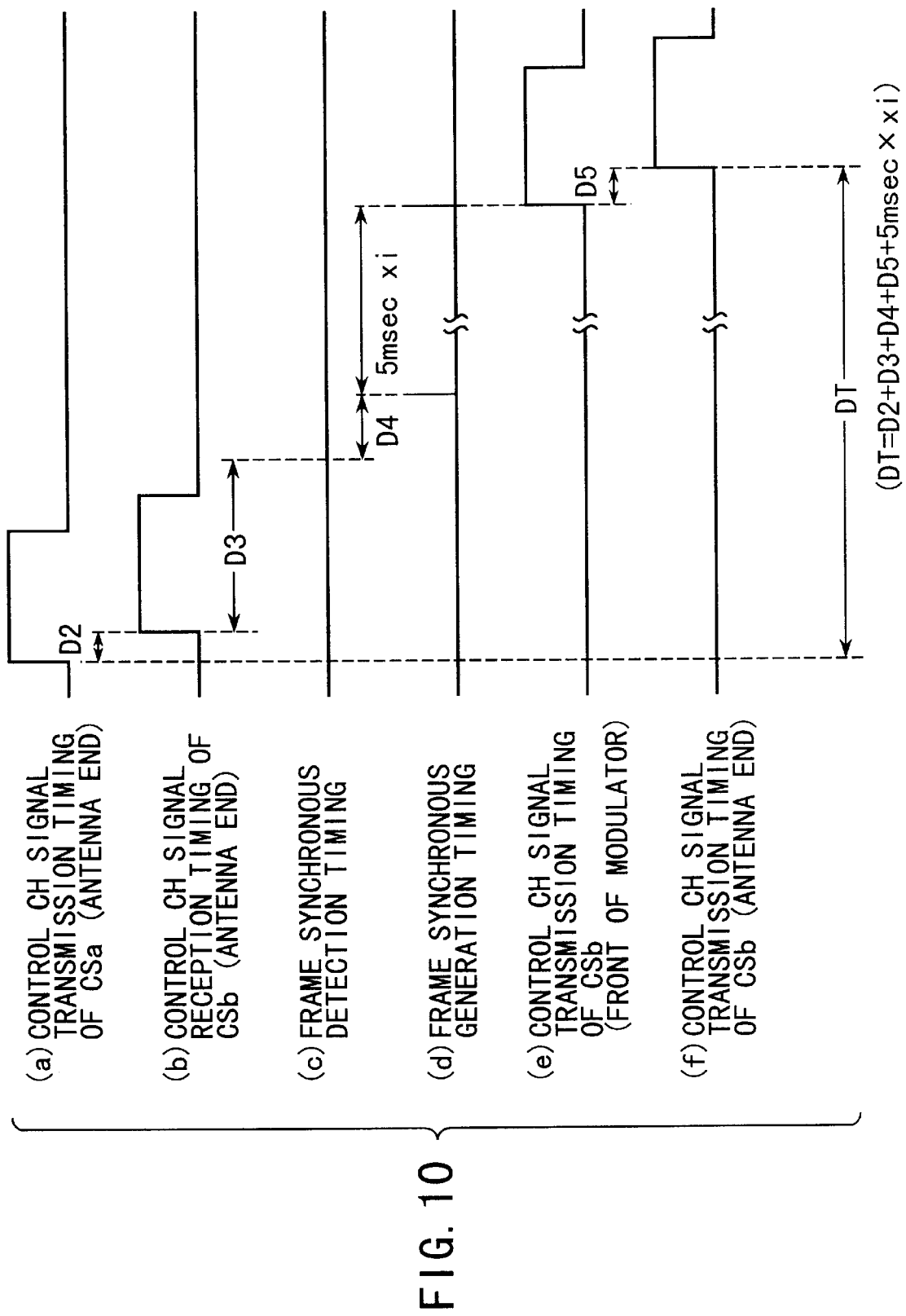
FIG. 10 is a timing chart for explaining a correcting function of a delay time in the base station shown in FIG. 6.

A function for correcting the propagation delay of the control channel signal between the base stations and the circuit operating delay caused within the base stations will next be explained. FIG. 10 is a timing chart for explaining this function.

It is now considered that the frame synchronization of a base station CSb is performed on the basis of the control channel signal of another base station CSa. In this case, transmission timing of the control channel signal of the base station CSa is provided as shown in FIG. 10(a) seen from an antenna end. This signal is delayed by a delay D2 during propagation and reaches the antenna end of the base station CSb in timing of FIG. 10(b). This signal goes through the receiving circuit 14, the demodulator 16, etc. and is then inputted to the frame timing detection/control circuit 54. In this frame timing detection/control circuit 54, this signal is detected in timing of FIG. 10(c) as frame timing. A time D3 from the reception of this signal at the antenna end to the detection of the frame timing is a delay time on a receiving side.

A time shift from this detection of the frame timing to the generation of a frame timing signal is set to D4. This time shift D4 is relative to an adjusting value of the delay time described later. For example, a frame interval is set to 5 ms. The control channel signal is generated in timing of FIG. 10(e) in accordance with frame synchronous timing of its own station shown in FIG. 10(d). Accordingly, a time from FIG. 10(c) to FIG. 10(e) is D4+5 msxi. Here, i is an integer. A delay time D5 on a transmitting side is a time required until a code of this control channel signal is transmitted to air in timing shown in FIG. 10(f) from ends of the antennas 11a, 11b through the modulator 20, the transmitting circuit 21, etc. Here, the control channel signal is generated in synchronization with the frame timing of its own station shown in FIG. 10(d). However, if it takes time to generate this control channel signal, this time is added to the delay time D5 as a delay time on the transmitting side.

Signal phases shown in FIGS. 10(a) and 10(f) are desirably set to the same phase in view of the frame synchronization. Namely, the generating time difference DT between these control channel signals is desirably set to an integer times the frame period 5 ms. Namely, it is sufficient to set (D2+D3+D4+D5) to an integer times 5 ms. D4 is an adjusting value and D2, D3 and D5 are generally times considerably shorter than the frame period. Therefore, it is actually sufficient to set the above time sum to 5 ms. Accordingly, the adjusting time D4=5 ms−D2−D3−D4 is formed.

Here, D3 and D5 are values known in advance from the design of a circuit of a base station or actual measurement. D2 is a propagation delay time between base stations and has different values in accordance with their distances and states. However, D2 is generally several μsec. Accordingly, no frame synchronous system is greatly deteriorated even if this D2 is neglected and is assumed to be zero.

However, when it is not preferable to deteriorate the frame synchronous system, an average delay time is assumed and may be provided as a fixed value. If a propagation delay amount between the base stations can be individually supposed, it is further effective to use this supposed value.

Namely, in a base station, the code of a control channel is generated in synchronization with the frame timing of its own station and is transmitted as a control channel signal from an antenna. A transmitting side delay time from this generation to this transmission is known in advance. Further, a receiving side delay time from reception of the control channel signal at an antenna end to the detection of frame timing is also known in advance. Furthermore, the propagation delay time between base stations is supposed. An adjusting time from the detection of the frame timing to the generation of a frame timing signal is set to a value provided by subtracting the transmitting side delay time, the receiving side delay time and the assumed or supposed propagation delay time between base stations from a frame period time. Thus, the frame timing between the base stations can be more accurately set.

Concrete examples for supposing the above propagation delay time will next be described.

Several models showing damping characteristics of propagation in the air are known. For example, there is a known model in which a damping amount is proportional to the 3.5 power of distance in a normal urban district space. In another model, the damping amount is proportional to the third power of distance until a certain distance, and is proportional to the fourth power of distance at this certain distance or more. In any model, an attenuation value Q can be presumed by a function of distance M. Namely, the attenuation value Q can be represented as follows.

$$Q=f(M)$$

Accordingly, if transmission power of the control channel signal of a certain base station CSk is now set to PTk and reception power of this control channel signal in another base station CSm is detected as PRm,k, the attenuation value Qkm between these two base stations CSk and CSm is calculated by Qkm=PTk/PRm,k.

In this case, the reception power is greatly changed by fading influences. Accordingly, it is necessary to receive plural control channel signals from one base station CS and set a maximum value of receiving levels of these control channel signals to PRm, k. Thus, if an inverse function f' ( ) of the above relation of distance and the attenuation value is used, the distance Mkm between the base stations CSk and CSm can be calculated as follows:

$$Mkm=f'(Qkm)$$

Namely, since the distance and the propagation delay are set to the proportional relation, the propagation delay Dkm between the base stations can be supposed if the transmission power of a partner base station and the reception power to its own station are known. It is generally considered that the relation of the attenuation value and the distance is shifted from the above-mentioned formula by an influence of multipass caused by reflection on a building, etc. However, the base stations are arranged in places relatively seen through and there is a large possibility that direct waves are transmitted between the stations if a small attenuation value, i.e., maximum receiving level, is used. Accordingly, a relatively correct propagation delay amount can be presumed.

Since the transmission powers of all the base stations are generally equal to each other, the delay amount can be supposed if the reception power is known. With respect to this delay amount, the propagation delay time can be calculated by receiving a signal showing a receiving level from the frame timing detection/control circuit 54. For example, a memory table showing the relation between the receiving level and the propagation delay time is arranged in the frame timing detection/control circuit 54.

When no transmission powers of the base stations are equal to each other, a signal directly showing transmission power or a signal indirectly showing the transmission power such as a class value for classifying the transmission power is inserted into an additional bit as one portion of contents of the control channel signal and is transmitted. Thus, a correct attenuation value is known on a receiving side so that the propagation delay time can be supposed.

When no signal showing the transmission power is transmitted in the control channel signal, a transmitting level can be known by a signal CS-ID showing a transmitting side base station in the control channel signal if a table showing adjacent base station numbers and transmitting levels is provided in the base station. Thus, the frame synchronization between the base stations can be more accurately performed.

In a method for presuming the propagation delay time in each of these cases, it is more preferable to select timing of the received control channel signal having a largest receiving level than to select earliest timing and explained by using FIG. 9.

Next, how to cope with a case in which there is a base station on communication, i.e., talking or transmitting data in the frame synchronous control period will next be explained. As mentioned above, the frame synchronous control period is set at midnight at which communication traffic is extremely low. However, it cannot be said that no communication is performed in the frame synchronous control period. When communication is performed in the frame synchronous control period, it is very unpreferable in service to compulsorily stop this communication. However, it is not preferable to leave a base station on communication as it is since each of surrounding slave base stations conforms the phase of frame timing to that of the frame timing of a control channel transmitted from this base station on communication.

Therefore, in this embodiment, when a base station is on communication, an "on communication mode" showing on communication is set to an additional bit in the control channel signal and this control channel signal is transmitted. When the ordinary frame synchronous control period is started on communication in each base station, or when communication is started in the ordinary frame synchronous control period, a frame timing setting operation of the frame timing detection/control circuit 54 is stopped and the present frame timing of its own station is maintained, and this communication is continued. When this communication is terminated, the above "on communication mode" is released and a new frame synchronous control period is set. The frame timing detection/control circuit 54 is then operated such that control for setting the frame timing of its own station is executed by receiving a control channel signal from a surrounding base station in which the frame synchronous control is already terminated.

In contrast to this, in the frame timing detection/control circuit 54 during the frame synchronous control period, a base station adjacent to the base station on communication judges whether or not the received control channel signal is transmitted from the base station on communication from a state of the additional bit of this received control channel signal. When it is judged that the base station is on communication, this control channel signal is removed from a timing reference of the frame synchronous control. Accordingly, when a base station on communication exists around the base station, the normal frame synchronization can be performed without any influence of this base station on communication.

The frame synchronous system may be constructed such that no new communication connecting request is received from a mobile station, another base station, another network, etc. during the frame synchronous control period. In this case, no new communication can be performed during the frame synchronous control period, but the frame synchronous control can be efficiently performed by communication control without interruption. When the reception of the new communication request is rejected in this way, an influence on the communication is small since the frame synchronous control period is a short time such as several seconds and the frame synchronous control is set in a period of small communication traffic. The above control is performed in the clock/control circuit 51.

The frame synchronous system may be also constructed such that talking is allowed during the frame synchronous control period although this system slightly becomes complicated. In this case, the control channel and a talking channel are set to different channels and, e.g., a flag is set to rise to discriminate the control channel signal so as to simultaneously receive and transmit the control channel signal and take talk. The frame synchronous system may be also constructed such that the frame synchronization is performed by the frame synchronous control signal simultaneously when the talk is terminated.

The flag may be used as follows. To set to rise the flag specifying on communication to the control channel signal of the base station on communication is described above, and an object of the flag is to specify removing the control channel signal from timing reference of the frame synchronous control. Therefore, the embodiment described above can be realized by changing the meaning of the flag from "on communication" to "timing reference prohibition".

When the frame synchronous control period starts, all of the base stations start at a flag condition of "timing reference prohibition" whether on communication or not. The base station not on communication is set to the all receiving mode, therefore the control channel signal is not transmitted. The base station on communication outputs the control channel signal having the flag of "timing reference prohibition". The base station terminating the frame synchronous control turns off the flag of "timing reference prohibition" and transmits the control channel signal.

On the other hand, when communication request is received before terminating the frame synchronous control, the all receiving mode is canceled once and communication can be permitted. At this time, the control channel signal is maintained in a "timing reference prohibition" condition. Then, the mode returns to the all receiving mode again after terminating the communication, and an operation can return to an operation so the frame synchronous control.

The present invention is not limited to the above embodiment. For example, the PHS is explained as an example in the above embodiment. However, the present invention may be also applied to another TDMA mobile communication system such as a digital personal handyphone system.

The present invention is also effectively applied to a case in which a multiple access system is a system except for the TDMA system, e.g., CDMA and FDMA systems. This is because the frame synchronization is required between base stations so as not to make a transmitting signal of another base station have an influence on a receiving signal of its own station if a TDD system is used in upward and downward transmissions.

Further, in the above embodiment, a communication network connected to a base station is set to a wire communication network such as an ISDN, but may be also set to a communication network using wireless transmission.

Furthermore, the present invention can be embodied in various kinds of modifications within the scope not departing from the features of the present invention.

What is claimed is:

1. An inter-base-station frame synchronous system in a mobile communication system comprising:

plural base stations dispersively arranged within a service area and connected to a communication network, and having at least one master base station and plural slave base stations; and plural mobile stations wirelessly connected to said plural base stations by a time-division bi-directional multiplex system, wherein said master base station comprises:

time information receiving means for receiving time information with high precision externally supplied;

reference frame timing generating means for generating reference frame timing for a time-divisional multiplex connection at a predetermined time based on said time information; and first control channel signal transmitting means for transmitting a control channel signal to said plural slave base stations located around said master base station in synchronization with said reference frame timing, wherein said slave base stations comprise:

control channel signal observation period setting means in which a predetermined time period is set as a control channel signal observation period starting from a first receiving time point of a control channel signal transmitted from said master base station or other slave base stations during a frame synchronization control period;

slave base station frame timing generating means for generating slave base station frame timing on the basis of receiving timing of the control channel signal transmitted from said master base station or one of the other slave base stations when only this control channel signal is received during said control channel signal observation period, said slave base station frame timing generating means also generating said slave base station frame timing on the basis of one of receiving timings of control channel signals respectively transmitted from said master base station or plural slave base stations among the other slave base stations when these control channel signals are received during said control channel signal observation period; and second control channel signal transmitting means for transmitting each control channel signal in synchronization with said slave base station frame timing after said control channel signal observation period is terminated, wherein said slave base station frame timing generating means generates said slave base station frame timing in synchronization with a frame timing based on a most advanced phase among plural frame timings of the control channel signals respectively transmitted from the master base station or plural slave base stations among the other slave base stations when these control channel signals are received during the control channel signal observation period.

2. The inter-base-station frame synchronous system of the mobile communication system according to claim 1, wherein, when the control channel signals respectively transmitted from the master base station or plural slave base stations among the other slave base stations are received, the frame timing of a most advanced phase among the plural frame timings based on the respective receiving timings of these control channel signals is discriminated as first frame timing within a period set at a frame interval from a time point shifted by a time about half this frame interval from a first receiving time point of the control channel signals during the control channel signal observation period.

3. An inter-base-station frame synchronous system in a mobile communication system comprising:

plural base stations dispersively arranged within a service area and connected to a communication network, and having at least one master base station and plural slave base stations; and plural mobile stations wirelessly connected to said plural base stations by a time-division bi-directional multiplex system, wherein said master base station comprises:

time information receiving means for receiving time information with high precision externally supplied;

reference frame timing generating means for generating reference frame timing for a time-divisional multiplex connection at a predetermined time based on said time information; and first control channel signal transmitting means for transmitting a control channel signal to said plural slave base stations located around said master base station in synchronization with said reference frame timing, wherein said slave base stations comprise:

control channel signal observation period setting means in which a predetermined time period is set as a control channel signal observation period starting from a first receiving time point of a control channel signal transmitted from said master base station or other slave base stations during a frame synchronization control period;

slave base station frame timing generating means for generating slave base station frame timing on the basis of receiving timing of the control channel signal transmitted from said master base station or one of the other slave base stations when only this control channel signal is received during said control channel signal observation period, said slave base station frame timing generating means also generating said slave base station frame timing on the basis of one of receiving timings of control channel signals respectively transmitted from said master base station or plural slave base stations among the other slave base stations when these control channel signals are received during said control channel signal observation period; and second control channel signal transmitting means for transmitting each control channel signal in synchronization with said slave base station frame timing after said control channel signal observation period is terminated, wherein said slave base station frame timing generating means generates said slave base station frame timing based on receiving timing at a maximum receiving level among the control channel signals respectively transmitted from the master base station or plural slave base stations among the other slave base stations when these control channel signals are received during the control channel signal observation period.

4. A method of synchronizing a plurality of base stations in an inter-base-station frame synchronous system of a mobile communication system, the method comprising the steps of:

generating, by a master base station, reference frame timing for a time-division multiplex connection in synchronization with predetermined synchronous setting timing set based on externally supplied time information;

transmitting, by the master base station, a control channel signal to a plurality of slave base stations located within a geographic zone around the master base station;

receiving, by a slave base station within the geographic zone during a frame synchronization control period, timing of the control channel signal transmitted by the master base station and setting a control channel observation period starting from a first receiving time point of the control channel signal;

generating, by the slave base station, reference frame timing based on the timing of the received control channel signal received during the channel observation period;

transmitting, by the slave base station after termination of the control channel observation period, a second control channel signal in synchronization with the reference frame timing of the slave base station, the second control channel signal being transmitted to a plurality of slave base stations in a second geographic zone around the base station.

5. The method of claim 4, further comprising:

receiving, by a second slave base station in the second geographic zone during a frame synchronization control period, timing of the second control channel signal and setting a second control channel observation period starting from a first receiving time point of the second control channel signal;

generating, by the second slave base station, reference frame timing based on the timing of the received second control channel signal received during the second channel observation period;

transmitting, by the second slave base station after termination of the second control channel observation period, a third control channel signal in synchronization with the reference frame timing of the second slave base station, the third control channel signal being transmitted to a plurality of slave base stations in a third geographic zone around the second base station.

6. A method of synchronizing a plurality of base stations in an inter-base-station frame synchronous system of a mobile communication system, the method comprising the steps of:

generating, by a master base station, reference frame timing for a time-division multiplex connection in synchronization with predetermined synchronous setting timing set based on externally supplied time information;

transmitting, by the master base station, a control channel signal to a plurality of slave base stations located within a geographic zone around the master base station;

receiving, by a slave base station within the geographic zone during a frame synchronization control period, timing of the control channel signal transmitted by one of the master base station and another slave base station and setting a control channel observation period starting from a first receiving time point of one of the control channel signal;

generating, by the slave base station, reference frame timing based on the timing of the received control channel signal received during the channel observation period; and transmitting, by the slave base station after termination of the control channel observation period, a control channel signal in synchronization with the reference frame timing of the slave base station, the control channel signal from the slave base station being transmitted to a plurality of slave base stations in a second geographic zone around the slave base station.

7. The method of claim 6, wherein when a plurality of the control channel signals are received during the control channel observation period, the generated reference frame timing of the slave base station is based on a frame timing of a most advanced phase among respective frame timings of the received control channel signals.

8. The method of claim 6, wherein when a plurality of the control channel signals are received during the control channel observation period, the generated reference frame timing of the slave base station is based on a frame timing of one of the received control channel signals having a maximum receiving level.

9. The method of claim 6, further comprising variably setting transmitting timing of the control channel signal generated by one of the master base station and the slave base station based on supposed delay information.

10. A master base station of an inter-base-station frame synchronous system in a mobile communication system, comprising:

time information receiving means for receiving time information with high precision externally supplied;

reference frame timing generating means for generating reference frame timing for a time division multiplex connection in synchronization with predetermined synchronous setting timing set based on said time information; and first control channel signal transmitting means for transmitting a control channel signal to a plurality of slave base stations located in a first geographic zone around said master base station in synchronization with said reference frame timing.

11. A slave base station of an inter-base-station frame synchronous system in a mobile communication system, comprising:

control channel signal observation period setting means in which a predetermined period from a first receiving time point of a control channel signal transmitted from another base station during a frame synchronization control period is set to a control channel signal observation period;

frame timing generating means for generating frame timing on the basis of receiving timing of the received control channel signal when said control channel signal is received during said control channel signal observation period set by said control channel signal observation period setting means, said frame timing generating means also generating said frame timing based on one of receiving timings of control channel signals respectively transmitted by one or more other base stations when the control channel signals are received during said control channel signal observation period; and control channel signal transmitting means for transmitting each control channel signal to other base stations within a geographic zone around said slave base station in synchronization with said frame timing after said control channel signal observation period is terminated, wherein said frame timing generating means generates said station frame timing in synchronization with a frame timing of a most advanced phase among a plurality of frame timings based on respective receiving timings of the control channel signals respectively transmitted from the one or more other base stations when these control channel signals are received during the control channel signal observation period.

12. A slave base station of an inter-base-station frame synchronous system in a mobile communication system, comprising:

control channel signal observation period setting means in which a predetermined period from a first receiving time point of a control channel signal transmitted from another base station during a frame synchronization control period is set to a control channel signal observation period;

frame timing generating means for generating frame timing on the basis of receiving timing of the received control channel signal when said control channel signal is received during said control channel signal observation period set by said control channel signal observation period setting means, said frame timing generating means also generating said frame timing based on one of receiving timings of control channel signals respectively transmitted by one or more other base stations when the control channel signals are received during said control channel signal observation period; and control channel signal transmitting means for transmitting each control channel signal to other base stations within a geographic zone around said slave base station in synchronization with said frame timing after said control channel signal observation period is terminated, wherein said frame timing generating means generates said frame timing based on receiving timing at a maximum receiving level among the control channel signals respectively transmitted from the one or more other base stations when the control channel signals are received during the control channel signal observation period.

* * * * *